US005342529A

United States Patent [19]

Gabor

[11] Patent Number: 5,342,529

[45] Date of Patent: Aug. 30, 1994

[54] PROCESS FOR MECHANICAL TREATMENT OF MEDIA IN LIQUID TO THIN-SLURRY FORM

[76] Inventor: Dieter Gabor, Im Holzgarten 2/1, DE-7143 Vaihingen/Enz, Fed. Rep. of Germany

[21] Appl. No.: 916,103

[22] PCT Filed: Jan. 30, 1991

[86] PCT No.: PCT/DE91/00087

§ 371 Date: Jul. 30, 1992

§ 102(e) Date: Jul. 30, 1992

[87] PCT Pub. No.: WO91/11251

PCT Pub. Date: Aug. 8, 1991

[30] Foreign Application Priority Data

Jan. 30, 1990 [DE] Fed. Rep. of Germany ....... 4002614

[51] Int. Cl.[5] ............................................ B01D 1/16

[52] U.S. Cl. .................................. 210/741; 210/747; 210/787; 210/242.2

[58] Field of Search ................ 261/120; 210/741, 742, 210/747, 767, 774, 780, 787, 805, 806, 242.2

[56] References Cited

U.S. PATENT DOCUMENTS 4,268,398 5/1981 Shuck et al. .................... 210/242.2
5,085,809 2/1992 Stirling ........................... 210/242.2

FOREIGN PATENT DOCUMENTS 298868 8/1954 Fed. Rep. of Germany .
568836 4/1924 France .

*Primary Examiner*—Robert A. Dawson
*Assistant Examiner*—W. L. Walker
*Attorney, Agent, or Firm*—Edwin E. Greigg; Ronald E. Greigg

[57] ABSTRACT

A process for mechanical treatment of media in liquid to thin-slurry form, in particular water, wastewater and a water and cement mixture, wherein to accelerate and improve the dispersion of the various components of the medium, this medium is carried from a supply container into a spraying apparatus, and the medium sprayed from it is collected and returned to the spraying apparatus and sprayed as often as needed until the desired outcome of treatment is attained.

17 Claims, 1 Drawing Sheet

PROCESS FOR MECHANICAL TREATMENT OF MEDIA IN LIQUID TO THIN-SLURRY FORM

The invention is based on a process for mechanical treatment of media in liquid to thin-slurry form. Many processes for mechanically treating media in liquid to thin-slurry form have become known; they are predominantly used in the fields of wastewater purification, water treatment, and the preparation of disperse mixtures. Turbulence is employed, particularly by means of rotors, to achieve intensive mixing of the starting components. Comminuting coarse components into smaller units is done to attain a high degree of dispersion.

In a known process of this type (German Published, Unexamined Patent Application DE-OS 32 41 011), the medium to be treated is fed from above into a funnel-like container; it flows through it from top to bottom by gravity and leaves it through a discharge opening provided at the lower end of the funnel. By means of this apparatus, a vortex-like turbulence is generated, which is intended to bring about intensive mixing of the components present in the medium, such as cement and water. This process has also been disclosed in a further development (German Published, Unexamined Patent Application DE-OS 33 25 952), in which a two-chamber system is used. The inner, funnel-like chamber again serves to make the medium that flows from top to bottom through the chamber by gravity turbulent; the outer chamber serves to return the medium leaving the inner chamber to the inlet opening of the inner chamber. For the return, a rotor supported in the vertical container axis is used; its vanes are located in the outer chamber underneath the discharge opening of the inner chamber, and it pumps the medium back to the inlet opening of the inner chamber counter to gravity.

These known processes have the disadvantage that the efficiency is not high enough to achieve an adequate degree of dispersion of the treated medium within reasonable periods of time. Despite the provision of propellers to reinforce the swirling action of gravity from suction and pumping, the energy input still remains too low.

In another known process (U.S. Pat. No. 4,628,391) for mixing a two-phase liquid mixture, the direction of circulation is reversed compared with the apparatus discussed above. The circulatory flow is brought about here, however, with a propeller or an impeller wheel, and the medium is aspirated from one chamber and ejected into a second chamber. The energy input is therefore too low to achieve an adequate degree of dispersion of the treated medium within reasonable periods of time.

OBJECT AND SUMMARY OF THE INVENTION

The object of the invention is therefore to further develop a generic process for mechanically treating media in liquid to thin-slurry form in such a manner that a high degree of dispersion of the components of the medium is attained within the shortest possible time. Moreover, the intensive mixing of the components of the medium is intended also to enable optional coagulation of components of the medium, in order to separate them from the remaining medium, for instance by sedimentation.

The process according to the invention has the advantage that by repeated spraying of the medium within a short time, a high energy input is possible, which leads to rapid dispersal of the components of the medium. Moreover, this treatment enables coagulation of certain components of the medium, so that they can be separated in the form of solids from the liquid components of the medium. The coagulation can be effected by clustering, for instance, which is promoted by the fine distribution of the components effected by the spraying apparatus.

Clustering is further promoted on the one hand, and the degree of distribution of the components of the medium is further increased on the other, by an advantageous further feature of the process of the invention, in which the medium to be treated is nebulized by the spraying device. In this nebulization, some liquid components of the medium change to the gas phase.

Pumping of the medium into the spraying apparatus can be done either by suction or by compression, in advantageous features of the invention. Suction or compression makes an additional energy input into the medium possible, for the sake of comminuting components of the medium and for dispersal.

In an advantageous further feature of these characteristics, the spraying apparatus is embodied as a spinner wheel, with an intake pipe that communicates on one end with the supply container of the medium and on the other with radially outwardly oriented conduits. The rotary speed of the spinner wheel and the cross sections of the flow conduits are selected such that the medium emerging from the radial conduits is nebulized, and some liquid components of the medium change to the gas phase. As a result of this embodiment, a high energy input and a high medium throughput through the spraying apparatus are made possible in a simple manner, with simultaneous assurance of the nebulization of the medium by the spraying apparatus.

In another advantageous feature of the invention, the suction is selected to be so great that liquid components of the medium in the suction conduits temporarily change to the gaseous state. This embodiment has the advantage that an additional reduction in size of solid components of the medium ensues, along with additional mixing of the entire medium, as a result of the cavitation effects that occur.

In another advantageous feature of these characteristics, the transition of liquid components of the medium to the gas phase is controlled by regulating the temperature of the medium, in this way, the cavitation effects can be employed purposefully. In particular, by increasing the temperature of the medium, the change to the gas phase of liquid components of the medium can be made easier, so that the mechanical requirements for attaining the cavitation effect can be kept low. However, it is also possible by temperature control to effect a maximum possible change in density of the medium by means of suction and atomization.

In another advantageous feature of the invention, the pressure conditions along the delivery conduits of the medium to the spraying apparatus are varied. As a result of this embodiment, the energy input into the medium is further increased, for example by promoting the cavitation effects.

In another advantageous feature of the invention, the mixing of various components of the medium is promoted by additional provisions, for instance by the flow configuration before and/or after the spraying of the medium. Such effects may for instance comprise vortex effects, which are attained by a suitable flow configuration.

Increasing the cavitation effects by reinforced gas production at the intake pipe could also be attained by varying the rotary speed of the spinner wheel. Varying the flow direction of the medium in the intake pipe and in the spinner wheel can likewise produce such effects. To achieve this, it may be useful to provide curved or arched conduits in the spinner wheel, instead of radially outwardly oriented conduits.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
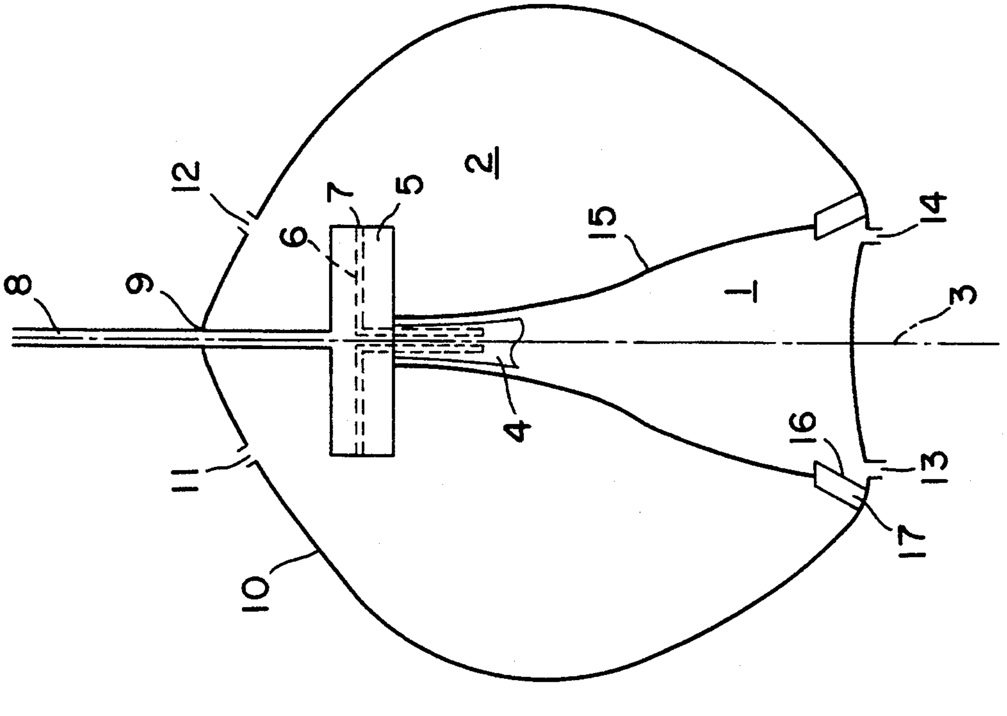
FIG. 1 shows a supply container with a spinner wheel and intake pipe disposed in the supply container.

The apparatus shown in FIG. 1 has a container with a bottle-shaped chamber 1, tapering toward the top, and a bell-shaped outer chamber 2, disposed around the first chamber; both are disposed rotationally symmetrically about an axis of symmetry 3. An intake pipe 4 has plunged into the upper region of the inner chamber 1 that more or less forms the neck of the bottle; with its end protruding out of the bottleneck of the inner chamber 1, it communicates form-fittingly with a spinner wheel 5. The spinner wheel 5 is likewise disposed rotationally symmetrically to the axis of symmetry 3 of the two chambers 1 and 2 and is provided with radial conduits 6, which extend from the region around the axis of rotation to the outer boundary of the spinner wheel 5, where they discharge into outward openings 7. On the other end, the radial conduits 6 discharge into the intake pipe 4, for which purpose they are bent at an angle toward the axis of symmetry 3.

A drive shaft 8, which is connected to a drive unit, not shown, is pivotably connected to the flat side, remote from the inner chamber 1, of the spinner wheel 5. The drive shaft 8 is extended through a recess 9 in the outer wall 10 of the outer chamber 2 to the outside; a seal may be provided between the shaft 8 and the outer wall 10. In its upper region, the outer wall 10 is provided with an overpressure valve 11 and a negative pressure valve 12 for regulating pressure in the outer chamber 2. In its lower region, the outer wall 10 has two further recesses, namely an inlet opening 13 and an outlet opening 14. The bottle-shaped outer wall 15 of the inner chamber 1 is firmly joined to the outer chamber 2, but a plurality of flow openings 16, upstream of which flow baffles 17 are disposed, are provided between the inner chamber 1 and the outer chamber 2.

Figure 2:
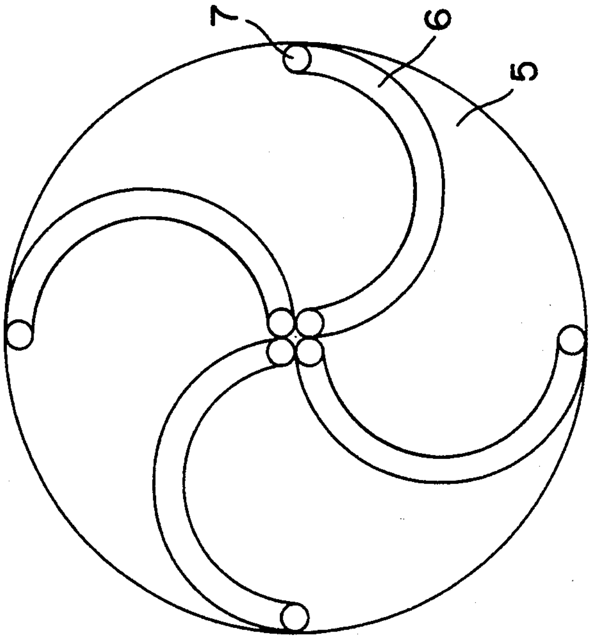
FIG. 2 shows a possible disposition of the flow conduits in the spinner wheel.

FIG. 2 shows a section through a spinner wheel 5 according to the invention, in which the radial conduits 6 extend in an arc from the inside outwardly, and the outlet openings 7 are disposed approximately at a tangent to the outer boundary of the spinner wheel 5.

The outlet from the conduits 6 of the spinner wheel 5 is above the fill level of the medium to be treated; the space in the outer chamber 2 provided for that purpose may be filled with air or some other suitable gas. Upon emerging, the medium, which is subjected to strong rotational and centrifugal acceleration, and which may be a mixture of various liquids and/or a liquid and solid mixture, changes to a mist and is spun into the air or gas volume of the chamber. The mist is absorbed by the already condensed or settled medium in the container 2. The medium is returned to the intake pipe 4 of the spinner wheel 5 through the flow openings 16.

In carrying out the process of the invention, it is also possible, however, to dispense with a closed treatment chamber, by causing the intake pipe of the spinner wheel to plunge into the medium, for example into a sewage treatment settling basin, a liquid manure pit, or a natural body of water.

The process is continued until such time as the desired outcome of treatment has occurred. However, the process can also be carried out continuously, by supplying medium continuously to the supply container and withdrawing some of the medium again after it has passed through the spraying apparatus. In so doing, it must be assured that the medium to be treated passes through the spraying apparatus at least once.

It has so far been possible to demonstrate the following outcomes of treatment. In producing a mixture of cement and water, it was possible to achieve an at least 10% lower water requirement for a quality of the final product that was at least as good as before. It was additionally possible to ascertain an increase in solidity in the cured state of the cement-water mixture. Fissuring was reduced. Homogeneity of the mixture was achieved in a shorter time, despite the smaller amount of water needed. The adhesive action of the final product is increased compared with known cement-water mixtures. The structure of the mixture is finer and smoother than in conventionally produced cement-water mixtures. The properties of mechanical strengths are improved compared with conventionally produced cement-water mixtures or final products formed from them.

In treating liquid manure or wastewater, it was possible to clarify the medium by precipitation or sedimentation of solid components. In this application, the coagulation effect of the process of the invention comes to the forefront. By the treatment of the medium according to the invention, solid components coagulate into larger units, such as clusters, and settle out. In the same way, the mineral component of water containing minerals can to a great extent be precipitated out or settled out, so that demineralized water is obtained. Any further change in treated water has so far not scientifically been detectable, but it would be likely from various consequential effects and properties of the treated water.

Water treated in this way has been used for instance in plant cultivation—better plant growth; in soil treatment—improvement of the soil structure; and in the medical field. In the medical field, there were some indications of a positive action on healing processes, normalization of metabolism when treated water was drunk—presumably because of increased oxygen takeup of the blood—and prevention and reduction of dental plaque with suitable employment of treated water.

In wastewater treatment, there are indications of improvement in the action of microbiological substances, and this improvement can be ascribed to an activation of these substances or better efficiency from increasing the surface area of the pollutant particles.

The foregoing relates to a preferred exemplary embodiment of the invention, it being understood that other variants and embodiments thereof are possible within the spirit and scope of the invention, the latter being defined by the appended claims.

I claim:

1. A process for mechanical treatment of media in liquid to thin-slurry form, in particular water, wastewater and a water and cement mixture, comprising the steps of pumping the medium by suction from a supply container into a spraying apparatus, nebulizing the medium to be treated by the spraying apparatus, whereby liquid components of the medium can temporarily change to a gaseous phase, and collecting the medium sprayed therefrom and returning same to the spraying apparatus for spraying as often as needed until a desired outcome of treatment is attained.

2. The process as defined by claim 1, in which the spraying apparatus, a spinner wheel having an intake pipe on one end communicating with the supply container of the medium and on the other end communicating with radially outwardly directed conduits, and the rpm of the spinner wheel and the cross sections of the flow conduits are selected such that the medium emerging from the conduits is nebulized and some liquid components of the medium become gaseous.

3. The process as defined by claim 2, in which the suction is selected to be so great that liquid components of the medium in the intake conduits temporarily change into a gaseous phase.

4. The process as defined by claim 3, comprising the further step of regulating the temperature of the medium to control transition of liquid components of the medium to gaseous.

5. The process as defined by claim 3, comprising the further step of varying the pressure conditions along the delivery conduits of the medium to the spraying apparatus.

6. The process as defined by claim 2, comprising the further step of regulating the temperature of the medium to control transition of liquid components of the medium to gaseous.

7. The process as defined by claim 2, comprising the further step of varying the pressure conditions along the delivery conduits of the medium to the spraying apparatus.

8. The process as defined by claim 1, in which the suction is selected to be so great that liquid components of the medium in the intake conduits temporarily change into a gaseous phase.

9. The process as defined by claim 8, comprising the further step of regulating the temperature of the medium to control transition of liquid components of the medium to gaseous.

10. The process as defined by claim 8, comprising the further step of varying the pressure conditions along the delivery conduits of the medium to the spraying apparatus.

11. The process as defined by claim 1, comprising the further step of varying the pressure conditions along the delivery conduits of the medium to the spraying apparatus.

12. A process for mechanical treatment of media in liquid to thin-slurry form, in particular water, wastewater and a water and cement mixture, comprising the steps of pumping the medium from a supply container into a spraying apparatus, nebulizing the medium to be treated by the spraying apparatus, whereby liquid components of the medium can temporarily change to a gaseous phase, promoting mixing different components of the medium by additional means, and collecting the medium sprayed therefrom and returning same to the spraying apparatus for spraying as often as needed until a desired outcome of treatment is attained.

13. The process as defined by claim 12, in which the mixing of different components of the medium is promoted by the flow configuration before spraying.

14. The process as defined by claim 13, in which the mixing of different components of the medium is promoted by the flow configuration after spraying.

15. The process as defined by claim 13, in which the mixing of different components of the medium is promoted by the flow configuration before and after spraying.

16. A process for mechanical treatment of media in liquid to thin-slurry form, in particular water, wastewater and a water and cement mixture, comprising the steps of pumping the medium from a supply container into a spraying apparatus, nebulizing the medium to be treated by the spraying apparatus, regulating the temperature of the medium to control transition of liquid components of the medium to a gaseous medium, and collecting the medium sprayed therefrom and returning same to the spraying apparatus for spraying as often as needed until a desired outcome of treatments is attained.

17. The process as defined by claim 16, in which said pumping step is carried out by compression.

* * * * *